Patented Sept. 25, 1928.

1,685,342

UNITED STATES PATENT OFFICE.

WALTER SCHOELLER, ADOLF FELDT, MAX GEHRKE, AND ERICH BORGWARDT, OF BERLIN, GERMANY, ASSIGNORS TO FIRM: CHEMISCHE FABRIK AUF ACTIEN, (VORM. E. SCHERING), OF BERLIN, GERMANY.

PHARMACEUTICAL PRODUCTS.

No Drawing. Original application filed May 9, 1925, Serial No. 29,307, and in Germany June 2, 1924. Divided and this application filed June 1, 1926. Serial No. 113,076.

Our invention refers to pharmaceutical products and more especially to products obtained from amino metal mercapto benzene compounds; it further refers to the methods of making such products. The new products are distinguished from the amino metal mercapto benzene compounds by a greater stability of the watery solutions of their salts and by a more favorable chemotherapeutical coefficient. We preferably obtain them by causing acylizing agents, such as anhydrides, halides or the like of acids to act on the compounds mentioned above in the form of their acids or salts.

The new products correspond to the formula

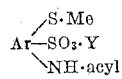

wherein Ar is a benzene nucleus, Me a heavy metal, and Y=either H or a metal, preferably an alkali metal. Acyl may be a saturated or non-saturated acid radical.

The new products are not easily soluble in water as acids, but easily soluble therein as alkali salts. In both forms they are soluble in alcohol only with difficulty. They are distinguished by their action on spirochætæ, more especially on spirochæta pallida and recurrens. In their gold and silver compounds the metal forms part of a complex compound and cannot be traced by means of the usual precipitating agents. The new products are preferably used in the form of their soluble salts, more especially sodium salts, by subcutaneous or intravenous injection.

In producing the new compounds according to the present invention we preferably proceed as follows:

*Example 1.*—10 parts of 4-amino-2-argento mercapto benzene-1-sulfonic sodium are dissolved in 100 parts of water and the solution is shaken with 4.2 parts of benzoyl chloride. The benzoyl compound which is hereby precipitated is well rinsed, dissolved in caustic soda and the sodium salt

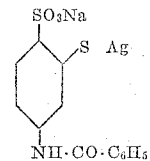

is precipitated with alcohol, forming a slightly yellow colored powder readily soluble in water.

*Example 2.*—10 parts 4-amino-2-auro mercapto benzene-1-sulfonic sodium are dissolved in 100 parts of water and well stirred with 2 parts of acetyl chloride. The acid which is precipitated is well rinsed with water, is then dissolved in caustic soda and the sodium salt of 4-acetyl amino-2-auro mercapto benzene-1-sulfonic acid

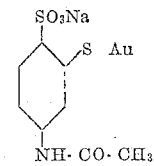

is precipitated with alcohol. It has the form of an almost colorless powder which readily dissolves in water.

*Example 3.*—20 parts of 4-amino-2-mercapto benzene-1-sulfonic acid are dissolved in 200 parts of a 2% caustic soda solution and 8 parts of acetyl chloride are added. The 4-acetyl amino-2-mercapto benzene-1-sulfonic acid which separates out is filtered by suction, is then dissolved in dilute caustic soda solution to form the sodium salt, and to this solution is now added a solution of 40 parts of potassium auro bromide in 400 parts of water, resulting in the precipitation of 4-acetyl amino-2-auro mercapto benzene-1-sulfonic acid having the formula

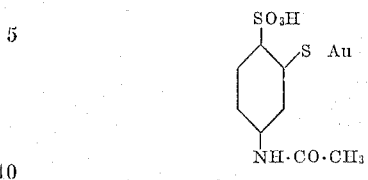

If other amino metal mercapto benzene compounds or their salts are employed, the process will give analogous results.

We wish it to be understood that we do not desire to be limited to the exact substances, proportions, conditions and sequence of operations above described for obvious modifications will occur to a person skilled in the art.

In the appended claims the term "acid" is designed to include also the soluble salts of the respective acids.

We claim:—

1. As a new product, the derivative of an amino metal mercapto compound corresponding to the formula

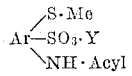

wherein Ar is a benzene nucleus, Me is a heavy metal, Y is hydrogen or an alkali metal, such product dissolving in water only with difficulty as an acid, readily as an alkali salt and having a therapeutical effect more especially in cases caused by spirochætæ.

2. The method of producing new derivatives of amino metal mercapto compounds, consisting in acting on an amino metal mercapto benzene sulfonic acid with an acylizing agent.

3. The method of producing new derivatives of amino metal mercapto compounds, consisting in acting on 4-amino-2-auro mercapto benzene-1-sulfonic acid with an acylizing agent.

4. As new products, the acetyl amino metal mercapto benzene sulfonic acids and their salts having the formula

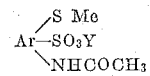

wherein Ar is a benzene nucleus, Me is a heavy metal, Y is hydrogen or an alkali metal, such product dissolving in water only with difficulty as an acid, readily as an alkali salt, and having a therapeutical effect more especially in cases caused by spirochætæ.

5. As new products, the acetyl amino auro mercapto benzene sulfonic acids and their salts having the formula

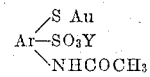

wherein Ar is a benzene nucleus, and Y is hydrogen or an alkali metal, such product dissolving in water only with difficulty as an acid, readily as an alkali salt, and having a therapeutical effect more especially in cases caused by spirochætæ.

6. The method of producing new derivatives of amino metal mercapto compounds, consisting in acting on 4-amino-2-metal mercapto benzene-1-sulfonic acid with an acylizing agent.

In testimony whereof we affix our signatures.

WALTER SCHOELLER.
ADOLF FELDT.
MAX GEHRKE.
ERICH BORGWARDT.